Patented Nov. 19, 1935

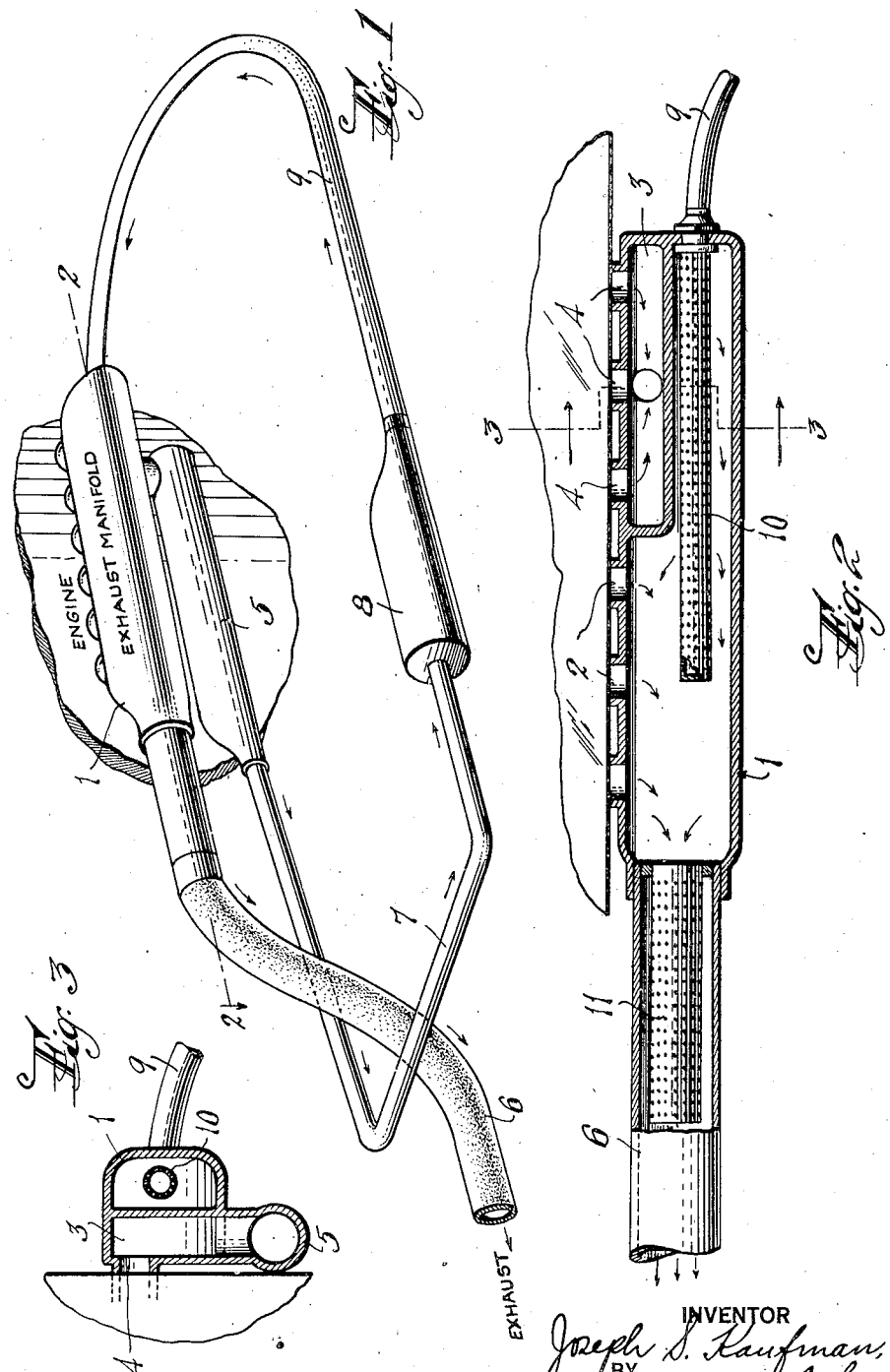

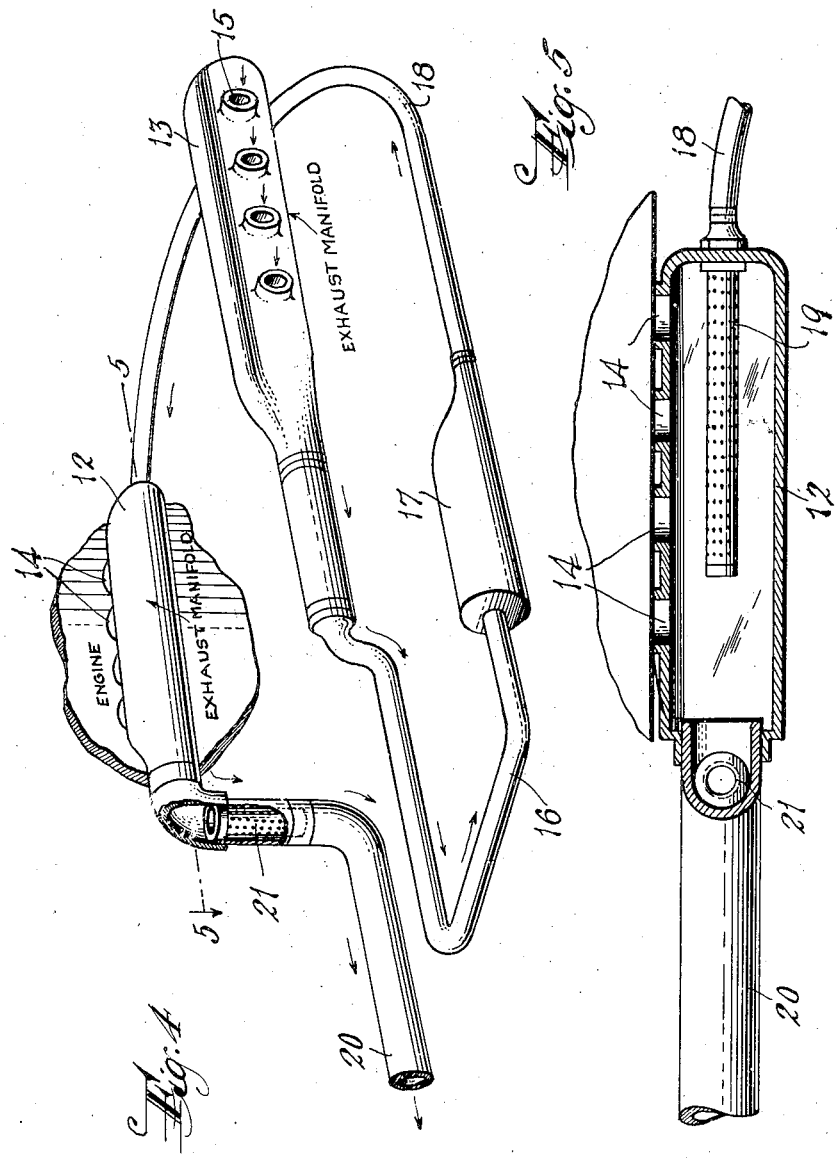

2,021,690

UNITED STATES PATENT OFFICE 2,021,690

METHOD OF AND APPARATUS FOR TREATING EXHAUST GASES

Joseph S. Kaufman, Newark, N. J.

Application September 11, 1933, Serial No. 688,954

13 Claims. (Cl. 23—2)

It is a well-known fact that exhaust gases of internal combustion engines and gases from other combustion processes, contain carbon monoxide which is highly toxic and has caused many deaths, especially in enclosed areas, such as garages in which automobile engines have been running. Furthermore, this poisonous gas from the exhausts of motor vehicles is a constant menace to health in our city streets and vehicular tunnels.

Many efforts have been made to treat exhaust gases in such a manner as to remove the carbon monoxide therefrom or transform the carbon monoxide into the harmless carbon dioxide, and among these efforts has been the proposal to cause reaction in the presence of a catalyst between the carbon monoxide and the water vapor normally present in exhaust gases, so that the oxygen in the water vapor will oxidize the carbon monoxide (CO) into carbon dioxide ($CO_2$). However, the methods and apparatus heretofore proposed or used have been either ineffectual or have been so complicated and expensive as to be impractical for use.

My invention also contemplates reaction between water vapor and carbon monoxide in exhaust gases in the presence of a catalyst an oxidizing agent to transform the monoxide into dioxide, and one object of my invention is to provide a novel and improved method and apparatus for accomplishing such reaction, which shall be effectual to transform substantially all of the carbon monoxide and shall be simple, inexpensive, reliable and durable.

In known methods and apparatus, such as described in United States Patent No. 1,867,325, the exhaust gases as they emerge from the engine cylinders are conducted through a casing into contact with a catalyst including a large quantity of iron oxide, at the normal operating temperatures of the gases in the exhaust manifold of the engine. With these methods and apparatus, complicated structures including special cartridges or masses of the catalytic material are required, which are expensive and impractical in use; and I believe, because of the high temperatures of the gases as they enter the exhaust manifold and the consequent dry or superheated character of the water vapors, the reaction between the carbon monoxide and the water vapor is not as complete as is possible, considering the quantity of water vapor present, which has been found, from analysis, to be capable of supplying more than enough oxygen to completely oxidize all of the carbon monoxide present.

Therefore, a prime object of my invention is to provide a novel and improved method and apparatus of the general character described which shall eliminate the necessity for special masses or cartridges of catalytic material and the incidental complicated structures, and whereby instead of utilizing the water vapor in the state in which it occurs in the gases, water vapor shall be produced by vaporization of water directly in the presence of and for reaction with the carbon monoxide, and preferably in the presence of a catalyst, so that the method and apparatus shall be simple, inexpensive and efficient.

Further objects are to provide such a method and apparatus wherein water shall be supplied by first condensing into liquid at least a portion of the water vapor present in the exhaust gases when they leave the engine cylinders, and this water shall then be vaporized into steam by the heat present in the exhaust gases; and to provide such a method and apparatus wherein the water shall be vaporized by direct contact with a hot metal, such as iron, in the presence of the exhaust gases, so that a catalytic or oxidizing agent, such as oxide of iron, shall be continually formed and serve as a catalyst for accelerating reaction between the water vapor and the carbon monoxide, whereby the reaction shall be substantially complete and the necessity for masses of catalytic material and complicated apparatus shall be obviated.

Other objects are to provide a method and apparatus of this character wherein the exhaust manifold of the engine shall serve as the hot iron for vaporizing the water and for forming the iron oxide; to provide such apparatus including novel and improved means for condensing the water vapor and causing contact thereof with the hot iron; to provide apparatus of this character which can be directly associated with the exhaust of an internal combustion engine and shall cause a minimum of back pressure on the engine; and to obtain other advantages and results as will be brought out by the following description.

Referring to the accompanying drawings in which corresponding and like parts are designated throughout the several views by the same reference characters, Figure 1 is a schematic perspective view of my apparatus for treating exhaust gases showing it applied to the exhaust of a six-cylinder internal combustion engine.

Figure 2 is an enlarged horizontal sectional view on the line 2—2 of Fig. 1.

Figure 3 is a transverse vertical sectional view on the line 3—3 of Figure 2.

Figure 4 is a view similar to Figure 1 showing the apparatus applied to an eight-cylinder internal combustion engine, and Figure 5 is a horizontal sectional view on the line 5—5 of Figure 3.

Specifically describing the embodiment of the invention illustrated in Figures 1 to 3 inclusive, the reference character I designates an exhaust manifold which is designed to receive the exhaust gases directly through ports 2 from three cylinders of a six-cylinder internal combustion engine. Closely adjacent to and preferably formed integral with the first manifold 1 is a second exhaust manifold 3 which is adapted to receive the exhaust gases through ports 4 directly from the other three cylinders of the six cylinder engine. The second exhaust manifold 3 has an outlet chamber 5 which is preferably of the same cross-sectional capacity as the exhaust pipe 6 which is connected to the first manifold 1. At the end of the outlet chamber 5 is connected one end of a condenser pipe 7, to the other end of which is connected an expansion and separator chamber 8 which is in turn connected through another pipe 9 to the end of the first manifold 1 opposite the exhaust pipe 6. Within the manifold 1 is arranged a spraying head 10 which is connected to the pipe 9 and has small perforations. The pipes 7 and 9 and the expansion chamber 8 may be arranged in any suitable place where they will be subjected to cooling, for example, along the underside of the chassis of an automobile so that the air currents beneath the automobile will cool the pipes and expansion chamber.

The manifolds 1 and 3 are of course heated to a high degree during operation of the engine, for example to approximately 200 to 500 degrees centigrade; and the manifolds are formed of a metal which upon contact therewith of steam will produce a catalytic material which is capable of accelerating the reaction between water vapor and carbon monoxide to transform the carbon monoxide to carbon dioxide. Preferably the manifold and exhaust pipes 6 are formed of iron which upon contact therewith of wet water vapor will form iron oxide.

In operation of the apparatus with the engine running, approximately half of the exhaust gases from the engine are conducted through the manifold 3 and the outlet chamber 5 to the condenser pipes 7 and 9 and the expansion and separator chamber 8. These gases are cooled during their passage through the pipes and expansion chamber and the water vapor in the gases is thereby condensed to liquid. When the gases and liquid reach the chamber 8, the gases are permitted to expand so as to reduce the pressure thereof, and at the same time the water or liquid is permitted to settle to the bottom of the chamber. The water and gases, under the pressure from the exhaust of the engine cylinders is forced through the pipe 9 into the spray head 10. Here the water is sprayed in fine jets over the hot walls of the exhaust manifolds and is almost instantaneously transformed into steam. From contact of the water with the walls of the manifold, iron oxide is formed and the water vapor is practically simultaneously vaporized into wet steam, which also contacts with the walls of the manifold. The iron oxide serves as a catalytic and oxidizing agent to accelerate reaction between the oxygen of the steam or water vapor and the carbon monoxide in the exhaust gases and oxidize the carbon monoxide into carbon dioxide. It will be noted that the cooled gases and the liquid are injected into the first manifold 1 and into the exhaust gases which are exhausted into the first manifold directly from three of the engine cylinders, so that the gases from all of the engine cylinders are subjected to the action of the water vapor in the presence of the catalytic agent, iron oxide. The gases then pass into the exhaust pipe 6, and for the purpose of transforming into carbon dioxide any carbon monoxide which may be left, I may provide a second spray head 11 in the exhaust pipe 6 at the outlet of the exhaust manifold 1 so that any particles of liquid as well as the steam will be sprayed on the walls of the exhaust pipe 6.

It has been found from use of the apparatus and analysis of the gases ejected from the exhaust pipe that practically all of the carbon monoxide in the exhaust gases from the engines is transformed into carbon dioxide or at least eliminated from the exhaust gases. It has further been found that the apparatus also transforms any unburned gasoline in the exhaust gases into other compounds. The apparatus due to its construction appears to produce no material back pressure on the engine, but does effectually serve as a muffler to reduce the noise of the exhaust. It will be observed that with my method and apparatus, the catalytic and oxidizing material, namely iron oxide, is continuously produced while the engine is running by contact of the water vapor with the walls of the exhaust manifold, and wet steam is constantly produced by vaporization of the liquid on the hot walls of the manifold. The temperatures in the apparatus are the normal temperatures of operation of an internal combustion engine so that no excessive heat is produced to interfere with or complicate the chemical reaction in the apparatus.

The invention is shown in Figures 4 and 5 as embodied in an eight-cylinder V-type internal combustion engine. In this form of engine, each cylinder block comprising four cylinders has a separate exhaust manifold and in the drawings the reference character 12 designates the exhaust manifold for one cylinder block while 13 designates the exhaust manifold for the other cylinder block. Each exhaust manifold receives the exhaust gases directly from the corresponding four engine cylinders through the respective ports 14 and 15. The gases from one of the manifolds, in the present instance the manifold 13, are conducted through a condenser pipe 16 like the pipe 7, and expansion and separator chambers 17 like the chamber 8, and a second condenser pipe 18 like the pipe 9. The pipe 18 is connected to the other manifold 12 and has a spray head 19 within the manifold corresponding to the spray head 10.

In operation, the gases from the four cylinders exhausting into the manifold 13 are cooled and the water vapor therein is condensed into liquid in exactly the same manner in which the gases are cooled and the water vapor condensed in the apparatus shown in Figures 1 to 3 inclusive. The cool gases and the liquid are injected through the spray head 19 into the manifold 12 and the liquid is vaporized into wet steam by contact with the hot walls of the manifold 12, and by such contact also forms iron oxide. The iron oxide accelerates the reaction between the water vapor or steam and the carbon dioxide in the gases from both manifolds, that is, from all of the engine cylinders, so as to transform the carbon monoxide into carbon dioxide.

The gases pass from the manifold 12 into the exhaust pipe 20, and for the purpose of transforming into carbon dioxide, any carbon monoxide remaining after the treatment of the gases in the manifold 12, I provide a second spray head 21 in the exhaust pipe 20, corresponding to the spray head 11.

It will be noted that in both forms of the apparatus, in addition to causing reaction between the carbon monoxide and water vapor in the exhaust gases, the apparatus also serves to cool all of the exhaust gases, which probably expedites the reaction and reduces the pressure and volume of the gases so as to reduce back pressure upon the engine cylinders and also reduce the noise incident to exhaust of the gases into the atmosphere.

It should be understood that the forms of the apparatus which I have shown are schematic and are illustrated and described primarily for the purpose of explaining the principle of the invention, and that the invention may be embodied in many different forms of apparatus and applied to treatment of other exhaust gases, without departing from the spirit or scope of the invention.

Having thus described my invention, what I claim is:

1. The method of treating exhaust gases consisting in continuously condensing the water vapor therein into liquid, and then continuously subjecting the liquid to contact with hot iron having a temperature sufficient to instantly vaporize the liquid into wet steam in the presence of the gases.

2. The method of treating exhaust gases consisting in cooling approximately half of the exhaust gases and condensing the water vapor therein to liquid, and then subjecting the liquid to contact with hot iron in the presence of all of the exhaust gases to vaporize the liquid into wet steam and form iron oxide.

3. The method of treating exhaust gases of internal combustion engines consisting in separating a portion of the gases from the whole volume of gases, cooling said portion of the exhaust gases and condensing the water vapor therein into liquid, and then injecting said cooled gases and liquid into the hot exhaust gases as they emerge from the engine cylinders and into contact with hot iron in the presence of said gases to vaporize said liquid and form iron oxide.

4. The method of treating exhaust gases from internal combustion engines having iron exhaust manifolds, consisting in continuously diverting a portion of the gases from the exhaust manifold of the engine during operation of the engine, cooling said diverted portion of the gases and condensing the vapors therein into liquid, and continuously injecting said cooled gases and liquid into the hot gases in the manifold and into contact with the inner hot walls of the manifold to continuously form iron oxide.

5. The method of treating exhaust gases of internal combustion engines, consisting in diverting and cooling a portion of the gases and condensing the vapor therein into liquid, mixing said portion with the other portions of the gases and subjecting the liquid to contact with hot iron having a temperature sufficient to instantly vaporize the liquid, in the presence of said mixed gases.

6. The method of treating exhaust gases of internal combustion engines consisting in cooling a portion of the exhaust gases and condensing the water vapor therein into liquid, and then injecting said cooled gases and liquid into the hot exhaust gases as they emerge from the engine cylinders and into contact with hot iron to vaporize said liquid and form iron oxide.

7. Apparatus for treating exhaust gases of internal combustion engines, comprising an iron manifold to receive the exhaust gases directly from the engine, means for diverting a portion of the exhaust gases from said manifold, means for cooling said portion of the gases and condensing the water vapor therein into liquid, and means for reinjecting said cooled gases and said liquid into said manifold so that said liquid is vaporized by contact with the hot walls of said manifold.

8. Apparatus for treating exhaust gases of internal combustion engines, comprising an iron manifold to receive the exhaust gases directly from some of the cylinders of the engine, another manifold to receive the exhaust gases from the other cylinders, means for cooling the gases from the second manifold to condense the water vapor therein, and means for re-injecting said cooled gases and the liquid into the first manifold so that said liquid is vaporized by contact with the hot walls of the manifold.

9. Apparatus for treating exhaust gases of internal combustion engines, comprising an iron manifold to receive the exhaust gases directly from some of the cylinders of the engine, another manifold to receive the exhaust gases from the other cylinders, and a condenser connected at one end to the second manifold and at the other end to said first manifold, whereby said gases from the second manifold are cooled and the water vapor therein is condensed into liquid, and said cooled gases and said liquid are injected into the first manifold so that said liquid is vaporized by contact with the hot walls of the manifold.

10. The apparatus set forth in claim 9 with the addition of a spray-head in said first manifold connected to said condenser for spraying said liquid into contact with the walls of the manifold.

11. Apparatus for treating exhaust gases of internal combustion engines, comprising a manifold to directly receive the gases from some of the cylinders of an engine, a second manifold to directly receive the gases from the other cylinders, a condenser pipe connected at one end to the second manifold to receive and cool the gases therein, an expansion and separator chamber connected to said condenser pipe to permit expansion and consequent reduction of pressure and volume of the gases and settling of the liquid, and a pipe connecting said expansion and separator chamber to the first manifold to inject the cooled gases and liquid into said first manifold so that the liquid is vaporized into steam by contact with the hot walls of the manifold in the presence of said exhaust gases, and iron oxide is formed to accelerate reaction between said steam and the carbon monoxide in said gases.

12. The apparatus set forth in claim 11 with the addition of a spray-nozzle in said first manifold to spray the liquid over the hot walls of the manifold.

13. The apparatus set forth in claim 11 with the addition of a spray-nozzle in said first manifold to spray the liquid over the hot walls of the manifold, an exhaust pipe connected to said first manifold, and a second spray-nozzle between said first manifold and the exhaust pipe to spray the remaining liquid over the hot walls of the exhaust pipe to form additional steam and iron oxide to oxidize any remaining carbon monoxide.

JOSEPH S. KAUFMAN.